United States Patent
Lee

(10) Patent No.: US 10,240,696 B2
(45) Date of Patent: Mar. 26, 2019

(54) PIPE HAVING RESISTANCE TO BOTH FIRE AND COLD

(71) Applicants: PPI PYUNGWHA CO., LTD., Hwaseong-si (KR); PPI America, Inc., Chicago, IL (US)

(72) Inventor: Jong-Tae Lee, Seoul (KR)

(73) Assignees: PPI PYUNGWHA CO., LTD., Hwaseong-si (KR); PPI AMERICA, INC., Chicago, IL (US)

( * ) Notice: Subject to any disclaimer, the term of this patent is extended or adjusted under 35 U.S.C. 154(b) by 245 days.

(21) Appl. No.: 14/443,411

(22) PCT Filed: Jan. 15, 2014

(86) PCT No.: PCT/KR2014/000416
§ 371 (c)(1),
(2) Date: May 18, 2015

(87) PCT Pub. No.: WO2014/208855
PCT Pub. Date: Dec. 31, 2014

(65) Prior Publication Data
US 2015/0323105 A1    Nov. 12, 2015

(30) Foreign Application Priority Data
Jun. 28, 2013   (KR) .......................... 10-2013-0075094

(51) Int. Cl.
*F16L 9/14* (2006.01)
*B32B 27/06* (2006.01)
(Continued)

(52) U.S. Cl.
CPC .................................... *F16L 9/14* (2013.01);
*B32B 1/08* (2013.01); *B32B 27/065* (2013.01);
*B32B 27/18* (2013.01);
(Continued)

(58) Field of Classification Search
CPC . B32B 2307/3605; B32B 1/08; B32B 27/065;
F16L 9/121; F16L 9/14; F16L 57/04
(Continued)

(56) References Cited

U.S. PATENT DOCUMENTS 4,055,537 A  *  10/1977  Kroenke .............. C08K 3/0075
                                                    524/100
4,360,624 A  *  11/1982  Huang .................. C09K 21/02
                                                    106/425
(Continued)

FOREIGN PATENT DOCUMENTS

JP        2002-071082 A      3/2002
JP        2008-180367 A      8/2008
(Continued)

OTHER PUBLICATIONS

International Search Report and Written Opinion of the Searching Authority dated Feb. 5, 2014 in parent International Application No. PCT/KR2014/000416 (8 pages, in Korean, with partial English translation of the substantive portion).

*Primary Examiner* — Lee E Sanderson
*Assistant Examiner* — Michael C Romanowski
(74) *Attorney, Agent, or Firm* — Sughrue Mion, PLLC

(57) ABSTRACT

The present invention relates to a pipe having resistance to both flame and cold, where the pipe has good flame resistance to prevent flame or smoke from spreading through the pipe penetrating into the floor or wall in the case of a fire and also has good smoke resistance to prevent deterioration in the physical properties of the pipe even in the cold weather.

6 Claims, 3 Drawing Sheets

(51) Int. Cl.
*B32B 27/18* (2006.01)
*B32B 27/30* (2006.01)
*B32B 1/08* (2006.01)
*F16L 9/12* (2006.01)
*F16L 59/14* (2006.01)

(52) U.S. Cl.
CPC .... *B32B 27/304* (2013.01); *B32B 2307/3065* (2013.01); *B32B 2419/00* (2013.01); *B32B 2597/00* (2013.01); *F16L 9/12* (2013.01); *F16L 59/145* (2013.01)

(58) Field of Classification Search
USPC ...... 428/36.9, 36.91, 36.92, 36.5, 34.7, 35.7
See application file for complete search history.

(56) References Cited

U.S. PATENT DOCUMENTS

| | | | |
|---|---|---|---|
| 2009/0082477 A1* | 3/2009 | Speas | C08G 18/10 521/94 |
| 2010/0173109 A1* | 7/2010 | Okabe | B32B 1/08 428/36.91 |
| 2010/0267853 A1* | 10/2010 | Edry | C09D 5/18 521/145 |
| 2011/0130496 A1* | 6/2011 | Shakir | B29C 45/0001 524/114 |

FOREIGN PATENT DOCUMENTS

| | | |
|---|---|---|
| JP | 2009-057995 A | 3/2009 |
| KR | 10-1227794 B1 | 1/2013 |

\* cited by examiner

PIPE HAVING RESISTANCE TO BOTH FIRE AND COLD

TECHNICAL FIELD

The present invention relates to a pipe having fire resistance and cold resistance that has good fire resistance to prevent diffusion of flame or smoke through a pipe transpiercing the through hole of the floor or the wall and good cold resistance to prevent deterioration of properties of the pipe even when the pipe is exposed to cold.

BACKGROUND ART

Multistory constructions, such as apartments or multiplex houses, are constructed to allow sewage from each story to be discharged through the vertical pipe of the building.

Most of the pipes used in the construction buildings are formed from a synthetic resin such as P.V.C. or the like and thus cause a problem that the flame or smoke is spread to the upper stories through the pipe in the case of a fire.

For that reason, the pipe material used for the through holes of the floor or wall is required to have flame resistance. Thus, there have been used cast-iron pipes or double-layered pipes that include an outer layer composed of fiber-reinforced mortar having flame resistance on the outer side of the pipe made of a synthetic resin material.

However, the double-layered pipes made of fiber-reinforced mortar involve a complicated production process with low productivity and high production cost, and the cast-iron pipes are difficult to construct due to heavy load.

As a solution to this problem, a fireproof expandable resin composition including an inorganic or organic expanding agent added to an ACE resin is formed into a sheet or a paste. The sheet of the fireproof expandable resin is wound around the synthetic resin pipe penetrating into the floor or wall, or the fireproof expandable resin in the form of paste is applied onto the synthetic resin pipe. The expandable resin composition expands when heated in the case of fire, to close or almost close the synthetic resin pipe softened by the temperature of the fire. This can prevent the flame or smoke from spreading upwards.

Although winding or applying the expandable resin sheet or paste may contribute to the lightweight of the pipe material, it is troublesome to perform the process of winding the expandable resin sheet or applying the expandable resin paste during the work, which makes the construction process too complicated and possibly leads to occurrence of defects during the winding or applying process, thereby causing the flame or smoke to spread upwards.

Technical Problem

For solving the problem with the prior art, it is an object of the present invention to provide a synthetic resin pipe with good fire resistance and a relatively light weight, which synthetic resin pipe is excellent in fire resistance and simply constructed.

It is another object of the present invention to provide a pipe with good cold resistance as well as good fire resistance that does not have deterioration in the properties in the cold weather.

Solution to Problem

In order to achieve the objects of the present invention, in accordance with one embodiment of the present invention, there is provided a pipe having resistance to both fire and cold that includes a single functional layer, where the pipe includes, with respect to 100 parts by weight of a PVC resin having a K-value of 72, 2.5 to 6.0 parts by weight of a methyl TIN stabilizer; 1 to 100 parts by weight of an expandable graphite; 1.0 to 2.0 parts by weight of Cellex as a foam enhancer; 5.0 to 10.0 parts by weight of aluminum hydroxide; 2.0 to 7.0 parts by weight of magnesium hydroxide; 5.0 to 10.0 parts by weight of zinc borate; and 2 to 8 parts by weight of calcium carbonate.

In accordance with another embodiment of the present invention, there is provided a pipe having resistance to both fire and cold that includes a functional layer and an outer protection layer for the functional layer. The functional layer includes: a PVC resin having a K-value of 67 or 72; with respect to 100 parts by weight of the PVC resin, 2.5 to 6.0 parts by weight of a methyl TIN stabilizer; 1 to 100 parts by weight of an expandable graphite; 1.0 to 2.0 parts by weight of Cellex A as a foam enhancer; 5.0 to 10.0 parts by weight of aluminum hydroxide; 2.0 to 7.0 parts by weight of magnesium hydroxide; and 5.0 to 10.0 parts by weight of zinc borate. The outer protection layer includes: a PVC resin having a K-value of 72; with respect to 100 parts by weight of the PVC resin, 2.5 to 6.0 parts by weight of a methyl TIN stabilizer; 1.0 to 5.0 parts by weight of an acrylic impact modifier; and 2 to 8 parts by weight of calcium carbonate.

In accordance with still another embodiment of the present invention, there is provided a pipe having resistance to both fire and cold that includes a functional layer, and an inner protection layer and an outer protection layer formed inside and outside the functional layer, respectively. The functional layer includes: a PVC resin having a K-value of 67 or 72; with respect to 100 parts by weight of the PVC resin, 2.5 to 6.0 parts by weight of a methyl TIN stabilizer; 1 to 200 parts by weight of an expandable graphite; 1.0 to 2.0 parts by weight of Cellex A as a foam enhancer; 5.0 to 10.0 parts by weight of aluminum hydroxide; 2.0 to 7.0 parts by weight of magnesium hydroxide; and 5.0 to 10.0 parts by weight of zinc borate. The inner protection layer and the outer protection layer include: a PVC resin having a K-value of 72; with respect to 100 parts by weight of the PVC resin, 2.5 to 6.0 parts by weight of a methyl TIN stabilizer; 1.0 to 5.0 parts by weight of an acrylic impact modifier; and 2 to 8 parts by weight of calcium carbonate, thereby constituting an outer layer.

In this regard, the functional layer further includes 2.0 to 7.0 parts by weight of a smoke suppressant with respect to 100 parts by weight of the PVC resin, where the smoke suppressant includes 25 to 45 wt. % of magnesium oxide, 2 to 15 wt. % of calcium oxide, 10 to 35 wt. % of silicon dioxide, 1 to 12 wt. % of aluminum oxide, 1 to 12 wt. % of zinc oxide, and 0.5 to 7 wt. % of titanium dioxide.

In addition, the functional layer further includes 0.1 to 1.0 part by weight of a mineral material with respect to 100 parts by weight of the PVC resin, where the mineral material includes at least one or two of calcium carbonate, aluminum trihydrate and zinc borate.

In addition, the functional layer further includes 1.0 to 5.0 parts by weight of an acrylic impact modifier with respect to 100 parts by weight of the PVC resin.

In addition, the expandable graphite has a layer structure comprising a sulfur or nitrogen compound between the layers thereof.

Advantageous Effects of the Invention

The pipe having resistance to both flame and cold according to the present invention as constructed above is excellent in flame resistance and lightweight, making it simple to construct and preventing deterioration in the properties of the pipe in cold weather.

MODES FOR CARRYING OUT THE INVENTION

Hereinafter, a detailed description will be given as to a pipe having resistance to both flame and cold according to the present invention.

Figure 1:
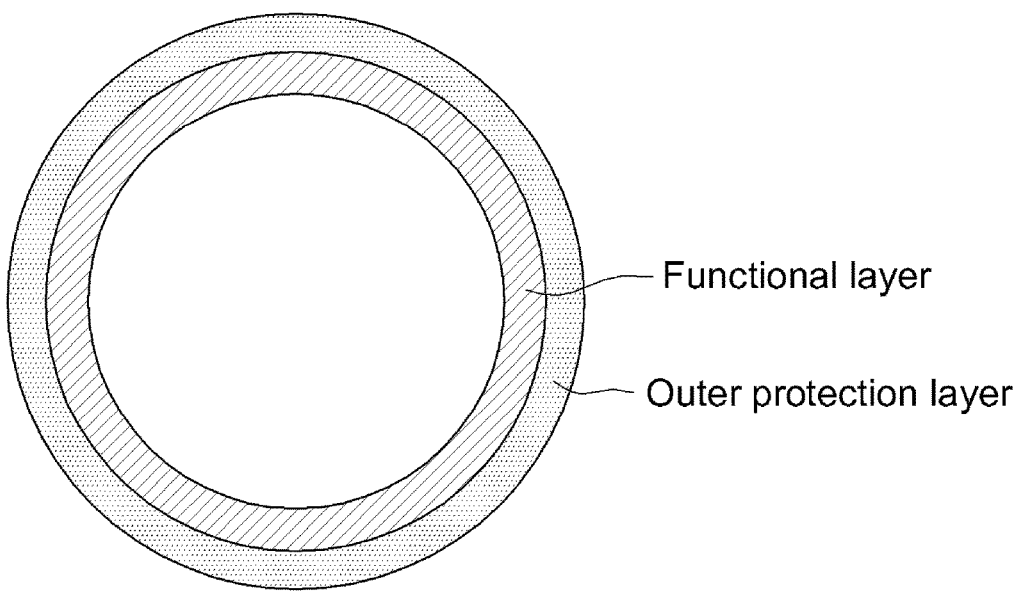
FIG. 1 is a cross-sectional view showing a pipe having resistance to both flame and cold according to one embodiment of the present invention.

FIG. 1 is a cross-sectional view showing a pipe having resistance to both flame and cold according to one embodiment of the present invention.

The pipe according to one embodiment of the present invention is formed to have a single functional layer, which is fabricated by extruding a resin composition composed of PVC resin used as a base resin, a stabilizer, an expanding agent, a foam enhancer, and calcium carbonate.

The base resin is the PVC resin, which is excellent in mechanical strengths, chemical resistance, and so forth and thus commonly used as civil engineering or construction materials.

The methyl TIN stabilizer is added in an amount of 2.5 to 6.0 parts by weight with respect to 100 parts by weight of the PVC resin having a K-value of 72.

The PVC resin having a K-value of 72 is excellent in heat resistance and tensile strength, strongly resistant to high hydrostatic pressure and impact, and good in flexural strength.

The thermal stabilizer is added to the PVC resin to maintain the physical and chemical properties of the resin while the PVC resin is being processed or in use. When the content of the stabilizer is less than 2.5 parts by weight, the workability deteriorates. When the content of the stabilizer is greater than 6.0 parts by weight, the production cost is increased too much with respect to the insignificant increase in the performance and the properties deteriorate. Accordingly, the methyl TIN stabilizer as the thermal stabilizer is added in an amount of 2.5 to 6.0 parts by weight.

1 to 100 parts by weight of the expandable graphite is added with respect to 100 parts by weight of the PVC resin.

The expandable graphite has a characteristic that it expands when heated. As the expandable graphite is incorporated into a pipe, the pipe with the expandable graphite expands in the case of fire to make the hole closed or almost closed.

The expandable graphite is used in an amount of 1 to 100 parts by weight with respect to 100 parts by weight of the PVC resin. When the content of the expandable graphite is less than 1 part by weight, the thermal expanding effect is insignificant. When the content of the expandable graphite is greater than 10 parts by weight, the workability deteriorates and the production cost with respect to the effect increases with the deterioration in the mechanical strength. Thus, the content of the expandable graphite is in the range of 5.0 to 10.0 parts by weight with respect to 100 parts by weight of the PVC resin.

Further, when the content of the expandable graphite exceeds 100 parts by weight, the graphite expands excessively to destroy the shape. Accordingly, the content of the expandable graphite is preferably in the range of 1 to 100 parts by weight.

The expandable graphite has a layer structure. A sulfur or nitrogen compound incorporated between the layers of the layer structure can increase the expansibility relative to the pure expandable graphite. For that reason, a sulfur or nitrogen compound is added between the layers of the expandable graphite having a layer structure.

1.0 to 2.0 parts by weight of Cellex A is added with respect to 100 parts by weight of the PVC resin.

The foam enhancer is to control the decomposition temperature and the foaming rate of the foaming agent. The added amount of the foam enhancer can be adjusted in accord to the use conditions. Cellex A, used as a foaming agent, is commonly used as a foam enhancer and will not be described in further detail.

2 to 8 parts by weight of calcium carbonate is added with respect to 100 parts by weight of the PVC resin.

Calcium carbonate is added to the resin to increase the strength of the pipe.

2.0 to 7.0 parts by weight of the smoke suppressant is added with respect to 100 parts by weight of the PVC resin.

The smoke suppressant is composed of 25 to 45 wt. % of magnesium oxide, 2 to 15 wt. % of calcium oxide, 10 to 35 wt. % of silicon dioxide, 1 to 12 wt. % of aluminum oxide, 1 to 12 wt. % of zinc oxide, and 0.5 to 7 wt. % of titanium dioxide.

The smoke suppressant is used in an amount of 2.0 to 7.0 parts by weight with respect to 100 parts by weight of the PVC resin. The smoke suppressant is added to the PVC resin to reduce smoke generated when the resin is burnt in the case of fire.

When the content of the smoke suppressant is less than 2.0 parts by weight, the smoke suppressing effect is insignificant. When the content of the smoke suppressant is greater than 7.0 parts by weight, the smoke suppressing effect is insignificant with respect to the increased amount of the smoke suppressant and the properties of the pipe deteriorate. Accordingly, the content of the smoke suppressant is preferably in the range of 2.0 to 7.0 parts by weight with respect to 100 parts by weight of the PVC resin.

The addition of the smoke suppressant to the PVC resin can not only reduce the generation of smoke in the case of fire but also increase the cold resistance of the pipe, preventing deterioration in the properties of the pipe in the severe cold weather and keeping the water flowing in the pipe from freezing.

In addition to the smoke suppressant used to suppress the generation of smoke in the case of fire, there are further added, with respect to 100 parts by weight of the PVC resin, 5.0 to 10.0 parts by weight of aluminum hydroxide, 2.0 to 7.0 parts by weight of magnesium hydroxide, and 5.0 to 10.0 parts by weight of zinc borate.

The addition of aluminum hydroxide, magnesium hydroxide and zinc borate to the PVC resin can minimize the generation of smoke when the resin is burnt in the case of fire.

When the contents of the aluminum hydroxide, magnesium hydroxide and zinc borate are less than the defined contents, the smoke suppressing effect is insignificant. When the contents of the aluminum hydroxide, magnesium hydroxide and zinc borate are greater than the defined contents, the smoke suppressing effect increases in proportion to the increased amount of the aluminum hydroxide, magnesium hydroxide and zinc borate, but the properties of the pipe deteriorate. Accordingly, the aluminum hydroxide, magnesium hydroxide and zinc borate are preferably added to the PVC resin in the above-defined amounts.

The addition of the aluminum hydroxide, magnesium hydroxide and zinc borate to the PVC resin can not only reduce the generation of smoke in the case of fire but also increase the cold resistance of the pipe, preventing deterioration in the properties of the pipe in the severe cold weather and keeping the water flowing in the pipe from freezing.

0.1 to 1.0 part by weight of a mineral material is added with respect to 100 parts by weight of the PVC resin.

The mineral material is composed of at least one or two of calcium carbonate, aluminum trihydrate and zinc borate. The mineral material is added to the PVC resin to increase the flame retardancy of the pipe.

When the content of the mineral material is less than 0.1 part by weight, the flame retarding effect is insignificant. When the content of the mineral material is greater than 1.0 part by weight, the properties of the pipe deteriorate. Accordingly, the content of the mineral material is preferably in the range of 0.1 to 1.0 part by weight.

The addition of the mineral material to the PVC resin can increase the cold resistance as well as the flame resistance, preventing deterioration in the properties of the pipe in cold weather and keeping water flowing in the pipe from freezing.

1.0 to 5.0 parts by weight of an acrylic impact modifier is added with respect to 100 parts by weight of the PVC resin.

The acrylic impact modifier is to enhance the impact resistance of the pipe against the external impact. When the content of the acrylic impact modifier is less than 1.0 part by weight, the impact resistance is too weak. When the content of the acrylic impact modifier is greater than 5.0 parts by weight, the tensile strength and the resistance to hydrostatic pressure are decreased and the economic efficiency and the workability deteriorate. Accordingly, the content of the acrylic impact modifier is preferably in the range of 1.0 to 5.0 parts by weight with respect to 100 parts by weight of the PVC resin.

Figure 2:
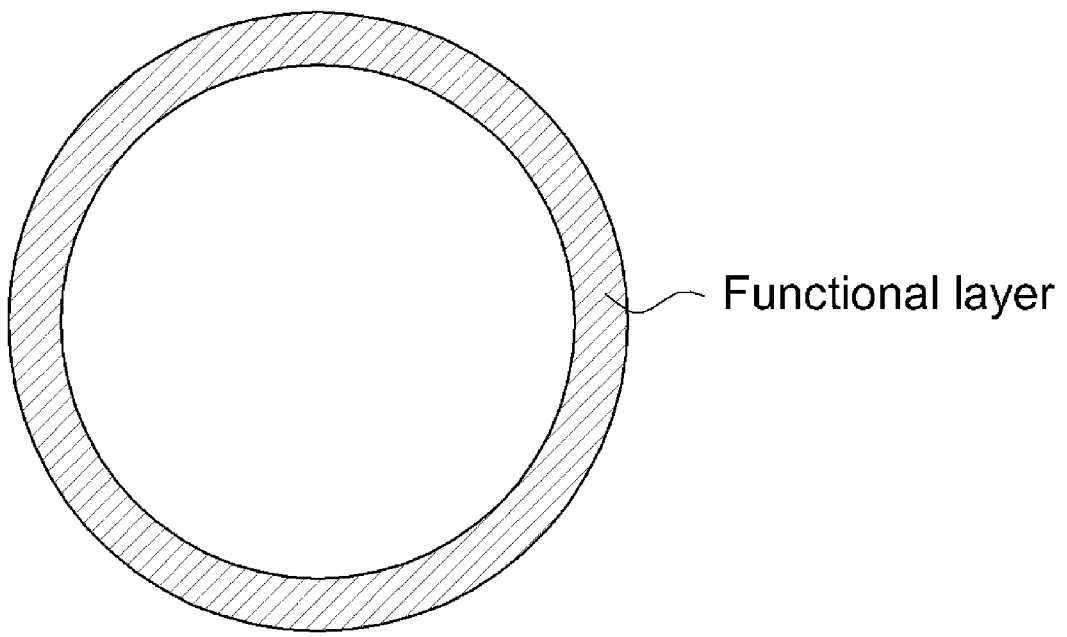
FIG. 2 is a cross-sectional view showing a pipe having resistance to both flame and cold according to another embodiment of the present invention.

FIG. 2 is a cross-sectional view showing a pipe having resistance to both flame and cold according to another embodiment of the present invention.

The pipe according to another embodiment of the present invention is a double-layered pipe as shown in FIG. 2, where the pipe is composed of a functional layer and an outer protection layer formed outside the functional layer.

The functional layer is composed of 100 parts by weight of PVC resin having a K-value of 67 or 72 as a base resin and 2.5 to 6.0 parts by weight of a methyl TIN stabilizer used as a stabilizer.

The thermal stabilizer is added to the PVC resin to maintain the physical and chemical properties of the resin while the PVC resin is being processed or in use. When the content of the stabilizer is less than 2.5 parts by weight, the workability deteriorates. When the content of the stabilizer is greater than 6.0 parts by weight, the production cost is increased too much with respect to the insignificant increase in the performance and the properties deteriorate. Accordingly, the methyl TIN stabilizer as the thermal stabilizer is added in an amount of 2.5 to 6.0 parts by weight.

1 to 100 parts by weight of the expandable graphite is added with respect to 100 parts by weight of the PVC resin.

The expandable graphite has a characteristic that it expands when heated. As the expandable graphite is incorporated into a pipe, the pipe with the expandable graphite expands in the case of fire to make the hole closed or almost closed.

The expandable graphite is used in an amount of 1 to 100 parts by weight with respect to 100 parts by weight of the PVC resin. When the content of the expandable graphite is less than 1 part by weight, the thermal expanding effect is insignificant. When the content of the expandable graphite is greater than 100 parts by weight, the workability deteriorates and the production cost with respect to the effect increases with the deterioration in the mechanical strength. Thus, the content of the expandable graphite is in the range of 1 to 100 parts by weight with respect to 100 parts by weight of the PVC resin.

Further, when the content of the expandable graphite exceeds 100 parts by weight, the graphite expands excessively to destroy the shape. Accordingly, the content of the expandable graphite is preferably in the range of 1 to 100 parts by weight.

The expandable graphite has a layer structure. A sulfur or nitrogen compound incorporated between the layers of the layer structure can increase the expansibility relative to the pure expandable graphite. For that reason, a sulfur or nitrogen compound is added between the layers of the expandable graphite having a layer structure.

1.0 to 2.0 parts by weight of Cellex A is added with respect to 100 parts by weight of the PVC resin.

The foam enhancer is to control the decomposition temperature and the foaming rate of the foaming agent. The added amount of the foam enhancer can be adjusted in accord to the use conditions. Cellex A, used as a foaming agent, is commonly used as a foam enhancer and will not be described in further detail.

2 to 8 parts by weight of calcium carbonate is added with respect to 100 parts by weight of the PVC resin.

Calcium carbonate is added to the resin to increase the strength of the pipe.

2.0 to 7.0 parts by weight of the smoke suppressant is added with respect to 100 parts by weight of the PVC resin.

The smoke suppressant is composed of 25 to 45 wt. % of magnesium oxide, 2 to 15 wt. % of calcium oxide, 10 to 35 wt. % of silicon dioxide, 1 to 12 wt. % of aluminum oxide, 1 to 12 wt. % of zinc oxide, and 0.5 to 7 wt. % of titanium dioxide.

The smoke suppressant is used in an amount of 2.0 to 7.0 parts by weight with respect to 100 parts by weight of the PVC resin. The smoke suppressant is added to the PVC resin to reduce smoke generated when the resin is burnt in the case of fire.

When the content of the smoke suppressant is less than 2.0 parts by weight, the smoke suppressing effect is insignificant. When the content of the smoke suppressant is greater than 7.0 parts by weight, the smoke suppressing effect is insignificant with respect to the increased amount of the smoke suppressant and the properties of the pipe deteriorate. Accordingly, the content of the smoke suppressant is preferably in the range of 2.0 to 7.0 parts by weight with respect to 100 parts by weight of the PVC resin.

The addition of the smoke suppressant to the PVC resin can not only reduce the generation of smoke in the case of fire but also increase the cold resistance of the pipe, preventing deterioration in the properties of the pipe in the severe cold weather and keeping the water flowing in the pipe from freezing.

In addition to the smoke suppressant used to suppress the generation of smoke in the case of fire, there are further added, with respect to 100 parts by weight of the PVC resin, 5.0 to 10.0 parts by weight of aluminum hydroxide, 2.0 to 7.0 parts by weight of magnesium hydroxide, and 5.0 to 10.0 parts by weight of zinc borate.

The addition of aluminum hydroxide, magnesium hydroxide and zinc borate to the PVC resin can minimize the generation of smoke when the resin is burnt in the case of fire.

When the contents of the aluminum hydroxide, magnesium hydroxide and zinc borate are less than the defined contents, the smoke suppressing effect is insignificant. When the contents of the aluminum hydroxide, magnesium hydroxide and zinc borate are greater than the defined contents, the smoke suppressing effect increases in proportion to the increased amount of the aluminum hydroxide, magnesium hydroxide and zinc borate, but the properties of the pipe deteriorate. Accordingly, the aluminum hydroxide, magnesium hydroxide and zinc borate are preferably added to the PVC resin in the above-defined amounts.

The addition of the aluminum hydroxide, magnesium hydroxide and zinc borate to the PVC resin can not only reduce the generation of smoke in the case of fire but also increase the cold resistance of the pipe, preventing deterioration in the properties of the pipe in the severe cold weather and keeping the water flowing in the pipe from freezing.

0.1 to 1.0 part by weight of a mineral material is added with respect to 100 parts by weight of the PVC resin.

The mineral material is composed of at least one or two of calcium carbonate, aluminum trihydrate and zinc borate. The mineral material is added to the PVC resin to increase the flame retardancy of the pipe.

When the content of the mineral material is less than 0.1 part by weight, the flame retarding effect is insignificant. When the content of the mineral material is greater than 1.0 part by weight, the properties of the pipe deteriorate. Accordingly, the content of the mineral material is preferably in the range of 0.1 to 1.0 part by weight.

The addition of the mineral material to the PVC resin can increase the cold resistance as well as the flame resistance, preventing deterioration in the properties of the pipe in cold weather and keeping water flowing in the pipe from freezing.

1.0 to 5.0 parts by weight of an acrylic impact modifier is added with respect to 100 parts by weight of the PVC resin.

The acrylic impact modifier is to enhance the impact resistance of the pipe against the external impact. When the content of the acrylic impact modifier is less than 1.0 part by weight, the impact resistance is too weak. When the content of the acrylic impact modifier is greater than 5.0 parts by weight, the tensile strength and the resistance to hydrostatic pressure are decreased and the economic efficiency and the workability deteriorate. Accordingly, the content of the acrylic impact modifier is preferably in the range of 1.0 to 5.0 parts by weight with respect to 100 parts by weight of the PVC resin.

The outer protection layer is composed of, with respect to 100 parts by weight of PVC resin having a K-value of 72, 2.5 to 6 parts by weight of a methyl TIN stabilizer, 1 to 5 parts by weight of an acrylic impact modifier, and 2 to 8 parts by weight of calcium carbonate.

1.0 to 5.0 parts by weight of a PVC resin having a K-value of 76 may be added with respect to 100 parts by weight of the PVC resin having a K-value of 72. The addition of the PVC resin having a K-value of 76 can enhance the thermal resistance and the mechanical properties, such as tensile strength, hydrostatic pressure resistance, impact resistance, flexural strength, and so forth.

When the content of the PVC resin having a K-value of 76 is less than 1.0 part by weight, the effect of increasing the properties is insignificant. When the content of the PVC resin having a K-value of 76 is greater than 5.0 parts by weight, the fluidity deteriorates to remarkably decrease the workability. Accordingly, the content of the PVC resin having a K-value of 76 is preferably in the range of 1.0 to 5.0 parts by weight.

2.5 to 6 parts by weight of a methyl TIN stabilizer is added with respect to 100 parts by weight of the PVC resin having a K-value of 72.

The thermal stabilizer is added to the PVC resin to maintain the physical and chemical properties of the resin while the PVC resin is being processed or in use. When the content of the stabilizer is less than 2.5 parts by weight, the workability deteriorates. When the content of the stabilizer is greater than 6.0 parts by weight, the production cost is increased too much with respect to the insignificant increase in the performance and the properties deteriorate. Accordingly, the methyl TIN stabilizer as the thermal stabilizer is preferably added in an amount of 2.5 to 6.0 parts by weight.

1.0 to 5.0 parts by weight of an acrylic impact modifier is added with respect to 100 parts by weight of the PVC resin.

The acrylic impact modifier is to enhance the impact resistance of the pipe against the external impact. When the content of the acrylic impact modifier is less than 1.0 part by weight, the impact resistance is too weak. When the content of the acrylic impact modifier is greater than 5.0 parts by weight, the tensile strength and the resistance to hydrostatic pressure are decreased and the economic efficiency and the workability deteriorate. Accordingly, the content of the acrylic impact modifier is preferably in the range of 1.0 to 5.0 parts by weight with respect to 100 parts by weight of the PVC resin.

2 to 8 parts by weight of calcium carbonate is added with respect to 100 parts by weight of the PVC resin.

The calcium carbonate is added to the PVC resin to increase the strength of the pipe.

0.1 to 1.0 part by weight of a mineral material is added with respect to 100 parts by weight of the PVC resin having a K-value of 72.

The mineral material is composed of at least one or two of calcium carbonate, aluminum trihydrate and zinc borate. The mineral material is added to the PVC resin to increase the flame retardancy and the cold resistance of the pipe.

When the content of the mineral material is less than 0.1 part by weight, the flame retarding effect and the cold resistance are insignificant. When the content of the mineral material is greater than 1.0 part by weight, the properties of the pipe deteriorate. Accordingly, the content of the mineral material is preferably in the range of 0.1 to 1.0 part by weight.

As the pipe is constructed to have a double-layered structure of a functional layer and an outer protection layer, the functional layer expands by heat in the case of fire to make the pipe closed or almost closed, thereby preventing flame or smoke from spreading upwards.

The functional layer is constructed to have good flame resistance, so the outer protection layer protects the functional layer, thereby protecting the pipe against the external impact and enhancing the flexural strength and the tensile strength.

Further, the functional layer may be formed inside the outer protection layer as described above, or the outer protection layer may be formed inside the functional layer.

Figure 3:
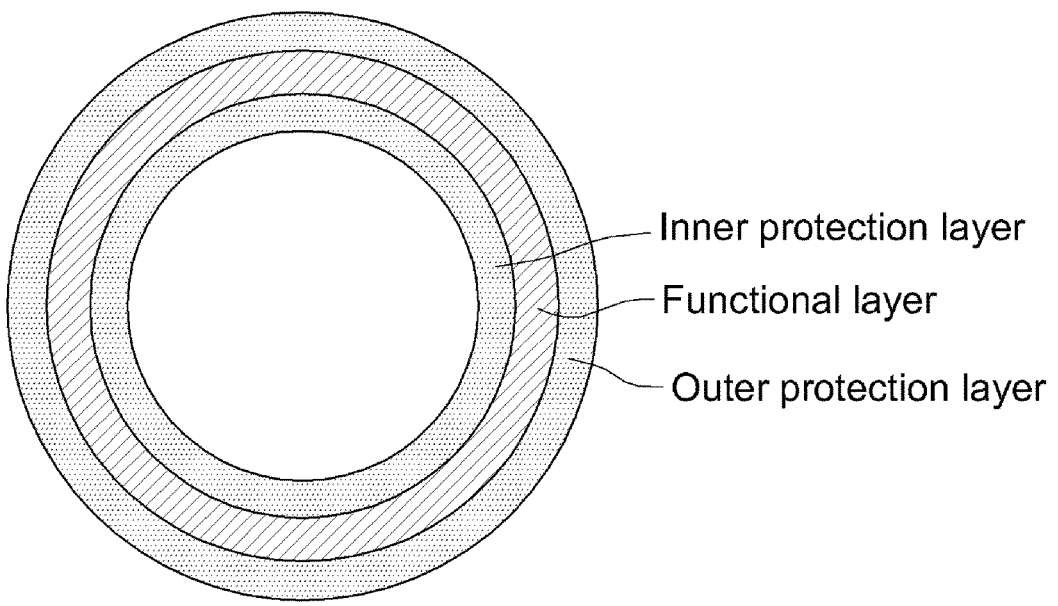
FIG. 3 is a cross-sectional view showing a pipe having resistance to both flame and cold according to still another embodiment of the present invention.

FIG. 3 is a cross-sectional view showing a pipe having resistance to both flame and cold according to still another embodiment of the present invention.

The pipe according to still another embodiment of the present invention is a triple-layered pipe as shown in FIG. 3, where the pipe is composed of a functional layer, and an inner protection layer and an outer protection layer formed inside and outside the functional layer, respectively.

The functional layer has the same composition of the functional layer of the pipe according another embodiment of the present invention, except for including an expandable graphite.

The expandable graphite is used in an amount of 1 to 200 parts by weight with respect to 100 parts by weight of the PVC resin. When the content of the expandable graphite is less than 1 part by weight, the thermal expanding effect is insignificant. When the content of the expandable graphite is greater than 200 parts by weight, the properties deteriorate and the graphite expands excessively to destroy the shape. Preferably, the functional layer includes 1 to 200 parts by weight of the expandable graphite with respect to 100 parts by weight of the PVC resin.

In still another embodiment of the present invention, the inner protection layer and the outer protection layer are provided inside and outside the functional layer, respectively. This can increase the added amount of the expandable graphite than the other embodiments shown in FIGS. 1 and 2, to more enhance the expansion.

The inner protection layer is composed of, with respect to 100 parts by weight of the PVC resin having a K-value of 72, 2.5 to 6.0 parts by weight of a methyl TIN stabilizer used as a stabilizer.

The thermal stabilizer is added to the PVC resin to maintain the physical and chemical properties of the resin while the PVC resin is being processed or in use. When the content of the stabilizer is less than 2.5 parts by weight, the workability deteriorates. When the content of the stabilizer is greater than 6.0 parts by weight, the production cost is increased too much with respect to the insignificant increase in the performance and the properties deteriorate. Accordingly, the methyl TIN stabilizer as the thermal stabilizer is preferably added in an amount of 2.5 to 6.0 parts by weight.

The above-constructed inner protection layer serves to protect the functional layer susceptible to expansion by heat against the fluid flowing in the pipe.

In the inner protection layer, 1.0 to 5.0 parts by weight of an acrylic impact modifier is added with respect to 100 parts by weight of the PVC resin.

The acrylic impact modifier is to enhance the impact resistance of the pipe against the external impact or the pressure of the fluid flowing in the pipe. When the content of the acrylic impact modifier is less than 1.0 part by weight, the impact resistance is too weak. When the content of the acrylic impact modifier is greater than 5.0 parts by weight, the tensile strength and the resistance to hydrostatic pressure are decreased and the economic efficiency and the workability deteriorate. Accordingly, the content of the acrylic impact modifier is preferably in the range of 1.0 to 5.0 parts by weight with respect to 100 parts by weight of the PVC resin.

0.1 to 1.0 part by weight of a mineral material is added with respect to 100 parts by weight of the PVC resin.

The mineral material is composed of at least one or two of calcium carbonate, aluminum trihydrate and zinc borate. The mineral material is added to the PVC resin to increase the flame retardancy of the pipe.

When the content of the mineral material is less than 0.1 part by weight, the flame retarding effect is insignificant. When the content of the mineral material is greater than 1.0 part by weight, the properties of the pipe deteriorate. Accordingly, the content of the mineral material is preferably in the range of 0.1 to 1.0 part by weight.

The addition of the mineral material can increase the cold resistance as well as the flame resistance to prevent deterioration in the properties of the pipe in the cold weather and keep the water flowing in the pipe from freezing.

2 to 8 parts by weight of calcium carbonate is added with respect to 100 parts by weight of the PVC resin.

The calcium carbonate is added to the PVC resin to increase the strength of the pipe.

Further, 1 to 5 parts by weight of the PVC resin having a K-value of 76 may be added with respect to 100 parts by weight of the PVC resin having a K-value of 72 to constitute a base resin.

The addition of the PVC resin having a K-value of 76 can enhance the thermal resistance and the mechanical properties, such as tensile strength, resistance to hydrostatic pressure, impact resistance, flexural strength, etc.

When the content of the PVC resin having a K-value of 76 is less than 1.0 part by weight, the effect of enhancing properties is insignificant. When the content of the PVC resin having a K-value of 76 is greater than 5.0 parts by weight, the fluidity deteriorates to remarkably reduce the workability. Accordingly, the content of the PVC resin having a K-value of 76 is preferably in the range of 1.0 to 5.0 parts by weight.

The outer protection layer constituting the still another embodiment of the present invention has the same composition of the inner protection layer.

The pipes of the present invention are evaluated in regards to flame resistance, smoke generation, and freeze-burst resistance as follows.

Example 1

A resin composition composed of 100 parts by weight of PVC resin (K-value: 72), 4 parts by weight of a methyl TIN stabilizer, 8 parts by weight of an expandable graphite, 1 part by weight of Cellex A, 7 parts by weight of aluminum hydroxide, 5 parts by weight of magnesium hydroxide, 7 parts by weight of zinc borate, and 5 parts by weight of calcium carbonate is extruded into a PVC pipe.

Example 2

5 parts by weight of a smoke suppressant is added to the composition of Example 1.

The smoke suppressant is composed of 40 wt. % of magnesium oxide, 12 wt. % of calcium oxide, 26 wt. % of silicon dioxide, 10 wt. % of aluminum oxide, 7 wt. % of zinc oxide, and 5 wt. % of titanium dioxide. The resultant resin composition is extruded into a PVC pipe.

Example 3

4 parts by weight of a mineral material is added to the composition of Example 2.

The mineral material is composed of calcium carbonate, aluminum trihydrate and zinc borate at a mixing ratio of 1:1:1. The resultant resin composition is extruded into a PVC pipe.

Comparative Example

A resin composition composed of 100 parts by weight of PVC resin, 1.6 part by weight of calcium stearate, 8 parts by weight of M.B.S. and 1.2 part by weight of paraffin wax is extruded into a general PVC pipe.

Experimental Methods

1) Flame Resistance

In the flame resistance testing, the pipe is inserted into the through hole of a 30 cm-thick wall so that one side is exposed to a fire. After 10 minutes, the temperature on the surface of the pipe 20 mm distant from the wall is measured. The temperature of the measurement point has not to exceed 180° C.

2) Smoke Generation

In one minute after the pipe is exposed to a fire, the amount of smoke generated is measured.

3) Freeze-Burst Resistance

A 1 m-long pipe is filled with water, closed at both ends and then kept at a temperature of −20° C. The time taken to freeze and break the pipe is measured.

TABLE 1

| | | Example | | | Comparative Example |
|---|---|---|---|---|---|
| | | 1 | 2 | 3 | |
| Composition (part by weight) | PVC resin | 100 | 100 | 100 | |
| | Methyl TIN stabilizer | 4 | 4 | 4 | |
| | Expandable graphite | 8 | 8 | 8 | |
| | Cellex A | 1 | 1 | 1 | |
| | Aluminum hydroxide | 7 | 7 | 7 | |
| | Magnesium hydroxide | 5 | 5 | 5 | |
| | Zinc borate | 7 | 7 | 7 | |
| | Calcium carbonate | 5 | 5 | 5 | |
| | Smoke suppressant | — | 5 | 5 | |
| | Mineral material | — | — | 1 | |
| Temperature measurement (° C.) | | 156 | 152 | 153 | 207 |
| Smoke generation (cm$^3$/sec) | | 12 | 6 | 5 | 53 |
| Freeze-burst resistance | | Normal for 20 hrs or more | Normal for 20 hrs or more | Normal for 20 hrs or more | Burst in 7 hrs |

As can be seen from Table 1, the temperature measurement is 270° C. for the comparative example and less than 180° C. for all the examples of the present invention. This reveals that the examples of the present invention are all excellent in flame resistance.

The smoke generation is 53 cm$^3$/sec for the comparative example and 12 cm$^3$/sec or less for the examples of the present invention, which is far less than the smoke generation of the comparative example.

In the comparative example, the pipe filled with water is frozen and burst in 7 hours at −20° C. In all the examples of the present invention, there is no freeze-burst of the pipe even in 20 hours at −20° C.

The above-constructed invention has the expandable graphite incorporated into the pipe and expand when heated in the case of fire to make the softened pipe closed or almost closed, thereby preventing flame or smoke from spreading upwards.

Further, the present invention can minimize the generation of smoke when the PVC resin used as a base resin is burnt, thereby preventing a possible accident of suffocation from smoke.

Furthermore, the pipe of the present invention is a lightweight to make the construction simple, has good strength and exhibits resistance to both flame and cold, thereby preventing deterioration in the properties of the pipe in the cold weather and keeping the fluid flowing in the pipe from freezing, which make it possible to prevent a freeze-burst accident of the pipe in the cold weather.

The foregoing description has been given as to a pipe having resistance to both flame and cold according to the present invention.

It would be appreciated by those skilled in the art that other embodiments may be encompassed without departing from the principles and spirit of the invention, the scope of which is defined by the claims and their equivalents.

The embodiments were chosen and described in order to best explain principles of the invention and its practical application to thereby enable others skilled in the art to best utilize the invention in various embodiments and with various modifications as are suited to the particular use contemplated. Although the invention has been disclosed with reference to its preferred embodiments, from reading this description those of skill in the art can appreciate changes and modifications that may be made which do not depart from the scope and spirit of the invention as described above and claimed hereafter. It is intended that the scope of the invention be defined by the claims appended hereto.

What is claimed is:

1. A pipe having resistance to both fire and cold, the pipe consisting essentially of a single functional layer,
    wherein said functional layer consists of a PVC resin composition,
    wherein said PVC resin composition consists essentially of 100 parts by weight of a PVC resin having a K-value of 72, and with respect to 100 parts by weight of the PVC resin, 2.5 to 6.0 parts by weight of a methyl tin stabilizer, 1 to 100 parts by weight of expandable graphite, 1.0 to 2.0 parts by weight of a foam enhancer, 5.0 to 10.0 parts by weight of aluminum hydroxide, 2.0 to 7.0 parts by weight of magnesium hydroxide, 5.0 to 10.0 parts by weight of zinc borate, and 2 to 8 parts by weight of calcium carbonate.

2. A pipe having resistance to both fire and cold, the pipe consisting essentially of a functional layer and an outer protection layer for the functional layer,
    wherein said functional layer consists of a PVC resin composition,
    wherein said PVC resin composition consists essentially of 100 parts by weight of a PVC resin having a K-value of 72, and with respect to 100 parts by weight of the PVC resin, 2.5 to 6.0 parts by weight of a methyl tin stabilizer, 1 to 100 parts by weight of an expandable graphite, 1.0 to 2.0 parts by weight of a foam enhancer, 5.0 to 10.0 parts by weight of aluminum hydroxide, 2.0 to 7.0 parts by weight of magnesium hydroxide, and 5.0 to 10.0 parts by weight of zinc borate,
    wherein said outer protection layer consists of a second PVC resin composition,
    wherein said second PVC resin composition consists essentially of 100 parts by weight of a PVC resin having a K-value of 72, and with respect to 100 parts by weight of the PVC resin, 2.5 to 6.0 parts by weight of a methyl tin stabilizer, 1.0 to 5.0 parts by weight of an acrylic impact modifier, and 2 to 8 parts by weight of calcium carbonate.

3. The pipe having resistance to both fire and cold as claimed in claim 2, wherein the outer protection layer is formed inside the functional layer.

4. A pipe having resistance to both fire and cold, the pipe consisting essentially of a functional layer, an inner protection layer formed inside the functional layer, and an outer protection layer formed outside the functional layer,
  wherein said functional layer consists of a PVC resin composition,
  wherein said PVC resin composition consists essentially of 100 parts by weight of a PVC resin having a K-value of 72, and with respect to 100 parts by weight of the PVC resin, 2.5 to 6.0 parts by weight of a methyl tin stabilizer, 1 to 200 parts by weight of an expandable graphite, 1.0 to 2.0 parts by weight of a foam enhancer, 5.0 to 10.0 parts by weight of aluminum hydroxide, 2.0 to 7.0 parts by weight of magnesium hydroxide, and 5.0 to 10.0 parts by weight of zinc borate,
  wherein said inner protection layer and said outer protection layer both consist of a second PVC resin composition,
  wherein said second PVC resin composition consists essentially of 100 parts by weight of a PVC resin having a K-value of 72, and with respect to 100 parts by weight of the PVC resin, 2.5 to 6.0 parts by weight of a methyl tin stabilizer, 1.0 to 5.0 parts by weight of an acrylic impact modifier, and 2 to 8 parts by weight of calcium carbonate.

5. The pipe having resistance to both fire and cold as claimed in any one of claims 1 to 4, wherein the PVC resin composition of the functional layer further comprises 1.0 to 5.0 parts by weight of an acrylic impact modifier with respect to 100 parts by weight of the PVC resin.

6. The pipe having resistance to both fire and cold as claimed in any one of claims 1 to 4, wherein the expandable graphite has a multi-layer structure comprising a sulfur or nitrogen compound between individual layers of the multi-layer structure.

* * * * *